Sept. 11, 1934.  F. M. CARROLL ET AL  1,972,978
ONE REVOLUTION CLUTCH
Filed Sept. 20, 1930   3 Sheets-Sheet 1

Inventors
Fred M. Carroll
Arthur F. Smith
Attorney
W. M. Wilson

Sept. 11, 1934.  F. M. CARROLL ET AL  1,972,978
ONE REVOLUTION CLUTCH
Filed Sept. 20, 1930   3 Sheets-Sheet 3

Inventors
Fred M. Carroll
Arthur F. Smith
Attorney
W. M. Wilson

Patented Sept. 11, 1934

1,972,978

UNITED STATES PATENT OFFICE 1,972,978

ONE REVOLUTION CLUTCH

Fred M. Carroll, Yonkers, and Arthur F. Smith, Brooklyn, N. Y., assignors, by mesne assignments, to International Business Machines Corporation, New York, N. Y., a corporation of New York Application September 20, 1930, Serial No. 483,262

12 Claims. (Cl. 192—149)

The invention relates to a clutch mechanism and more particularly to a so-called one revolution clutch of the type used in automatic accounting machines.

In the operation of accounting and other cyclically operable machines it is frequently necessary that certain parts be connected to the driving mechanism for one or more complete cycles and then be disconnected therefrom so that they always come to rest in a predetermined position. For example, a certain shaft may have to be clutched to another driving shaft to cause it to make one or more complete revolutions or a predetermined portion of a revolution and then be disconnected so that it resumes its original position or a position definitely related to its original position. The usual type of clutch used for this purpose is called a one revolution clutch and consists of a notched disk on the driving shaft and a coacting member on the driven shaft carrying a pawl urged to engage the notch. The pawl is normally held out of engaging position by a latch so that the driving shaft rotates freely, but momentary release of the latch causes the pawl to engage the notch and rotate the member carrying it with the notched disk. After a single revolution or a predetermined portion of a revolution the latch again engages the pawl and releases it from the notch and thereafter the pawl is held out of clutching position and the driven member is held stationary until the latch is again released.

The pawls and the coacting notches of these clutches have hitherto been provided with straight coacting edges so that on clutching engagement the driven part starts suddenly, being forced to attain the speed of the driving member substantially instantaneously. Also on stopping as the pawl latch has usually acted as a stop member as well as a releasing member for the driven disk this disk is also stopped with a jerk. Consequently both the starting and stopping operations have occasioned sudden shocks to the machinery from which unusual wear and tear results.

It is not necessary during a certain portion of each cycle that any driving part maintain absolute synchronism with the driven part but this portion of the cycle practically always starts an appreciable time after the beginning of the cycle and ends an appreciable time prior to the end of the cycle. This is taken advantage of according to the present invention to start the driven member slowly at the beginning of each clutching action, only establishing actual driving connection when the two parts are running at practically the same speed. At the end of the active portion of the cycle the pawl is released before the driven member reaches its normal rest position so that it may coast to the rest position, losing speed meanwhile through retarding mechanism, and when finally it reaches rest position and is stopped its momentum is practically dissipated.

According to the preferred form of the invention, braking mechanism is provided which moves into engagement with the driven member after it is released from the driving pawl. At such time the braking or retarding mechanism is moving at a rate equal to the driven member which it gradually decelerates from the point of engagement until the rest position. With the machine operating at high speed, the retarding device prevents the high momentum of the driven mechanism from further rotating the parts after the initial position has been reached.

On the other hand where the machine is operating at considerably slower speed notably under manual control, the driven parts do not attain sufficient momentum to continue their rotation after they have been disconnected from the driver. That is, they are not traveling at a sufficiently high rate of speed to bring them to home position under their own inertia.

In the present embodiment, a homing device is provided to engage the driven mechanism after it is released from the driver and advance it to rest position.

This homing device consists of a pawl mounted upon a constantly oscillating member, and adapted to lie in the path of a pin secured in the driven mechanism. If when the pin and pawl are in operating relationship the former is traveling at a lesser rate than the latter, it will be engaged thereby and urged forward until it reaches home position. In this manner through the agency of both the retarding and homing device the mechanism is returned to its initial position in a positive manner under all conditions under which the machine may operate. If it is turning at high speed, a retarding influence is imposed to gradually bring it to rest or if it is subjected to excessive strain resulting in the lowering of its speed an additional force is imposed to positively insure its return to starting position.

An object of the invention is to provide a clutch of the one revolution type in which the driven member is started with gradually increasing speed and stopped with gradually decreasing speed.

Another object is to provide a homing device for a clutch of the one revolution type which positively returns the driven member to initial position irrespective of its speed of rotation.

Various other objects and advantages of our invention will be obvious from the following particular description of one form of mechanism embodying the invention or from an inspection of the accompanying drawings; and the invention also constitutes certain new and novel features of construction and combination of parts hereinafter set forth and claimed.

In the drawings:

Fig. 6 is a detail of certain cams and related follower arms.

Fig. 7 is a detail position view of parts shown in Fig. 2.

The clutch has been illustrated by way of example as a connecting or clutching mechanism between a driving shaft 10 and a driven shaft 11. The driving shaft 10 rotates constantly while the driven shaft is normally stationary but may be clutched to rotate with the driving shaft by means of the clutch to be hereinafter described and when so clutched will make one complete revolution and then automatically stop unless the clutch releasing mechanism is again actuated. The driven shaft therefore always makes one or more complete revolutions and always comes to rest in the same position.

Figure 2:
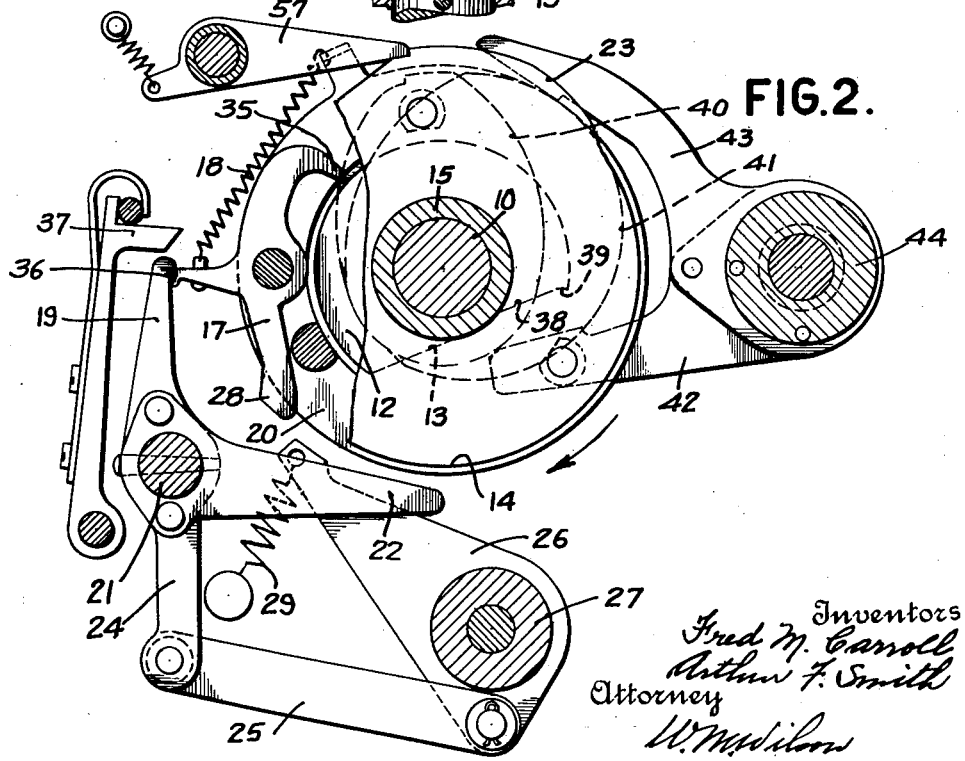
Fig. 2 is an elevational section taken on line 2—2 of Fig. 1.
Figure 3:
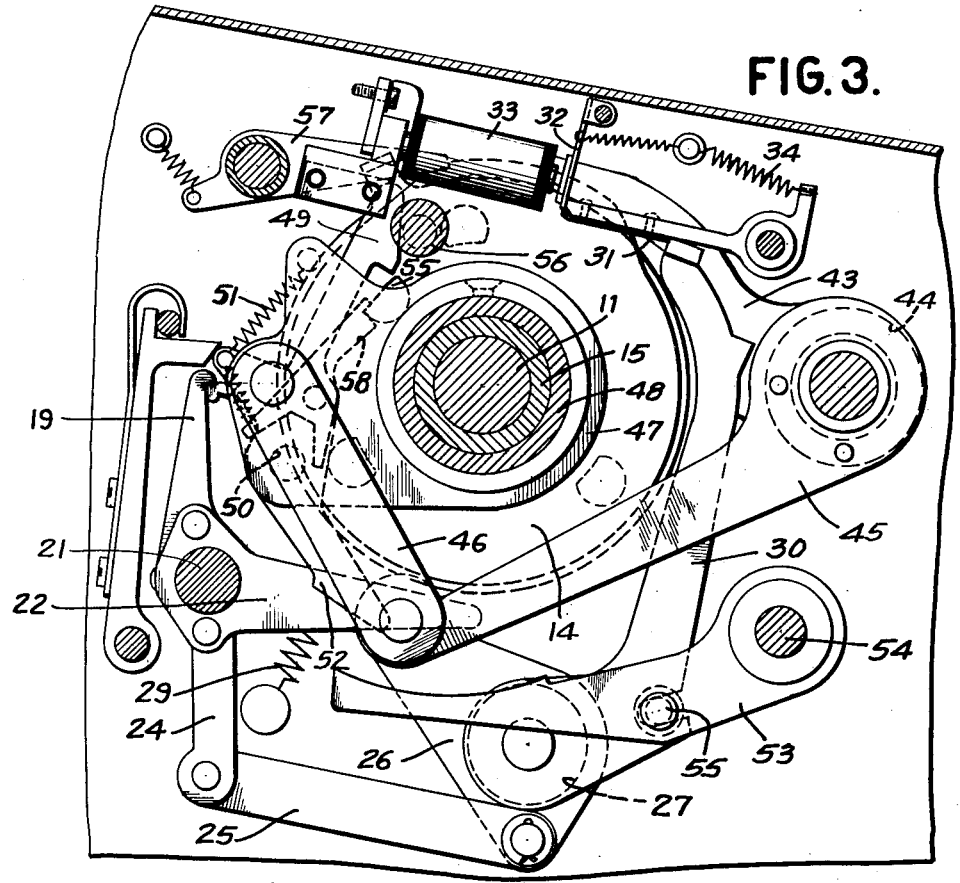
Fig. 3 is an elevational section taken on line 3—3 of Fig. 1.

The clutch consists of a disk 12 secured to the driving shaft 10 and having a notch 13 of a peculiar form in its periphery. A second disk 14 having a long hub 15 is secured to the driven shaft 11 by a pin 16 and carries a pivoted operating pawl 17 urged by a spring 18 to constantly engage in the notch 13 but normally restrained from doing so by a latch 19. A ring 20 is supported upon studs secured in disk 14 and assists in supporting pawl 17 and has a projection to which one end of spring 18 is attached. The disks 12 and 14 comprise the two coacting elements of the clutch. The latch 19 is mounted upon a rod 21 and has a finger 22 secured thereto which lies in the plane of disk 14 and is adapted to be engaged by the cam surface 23 of the disk. A depending arm 24 of latch 19 has link connection 25 to a lever 26 integral with a sleeve 27. Lever 26 lies in the path of the end 28 of pawl 17 and is adapted to cause the pawl to disengage disk 12 in a manner to be explained later. A spring 29 serves to hold the parts in the position of Fig. 2. In Fig. 3 the sleeve 27 carries an arm 30 whose upper end abuts a latching plate 31 which in turn is held in the position shown by the armature latch 32 of magnet 33. The pressure angle between the upper end of arm 30 and plate 31 is such that release of the plate by armature 32 will permit arm 30 to cam the plate 31 upwardly against the tension of its light restoring spring 34.

Figure 4:
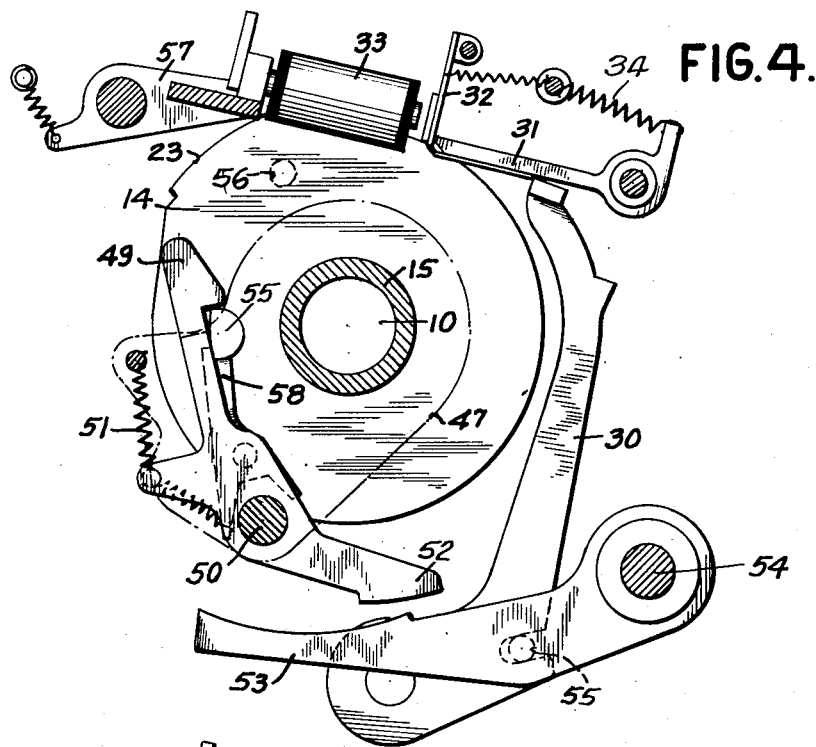
Fig. 4 is a position view of parts showing the retarding device in engaging position.
Figure 5:
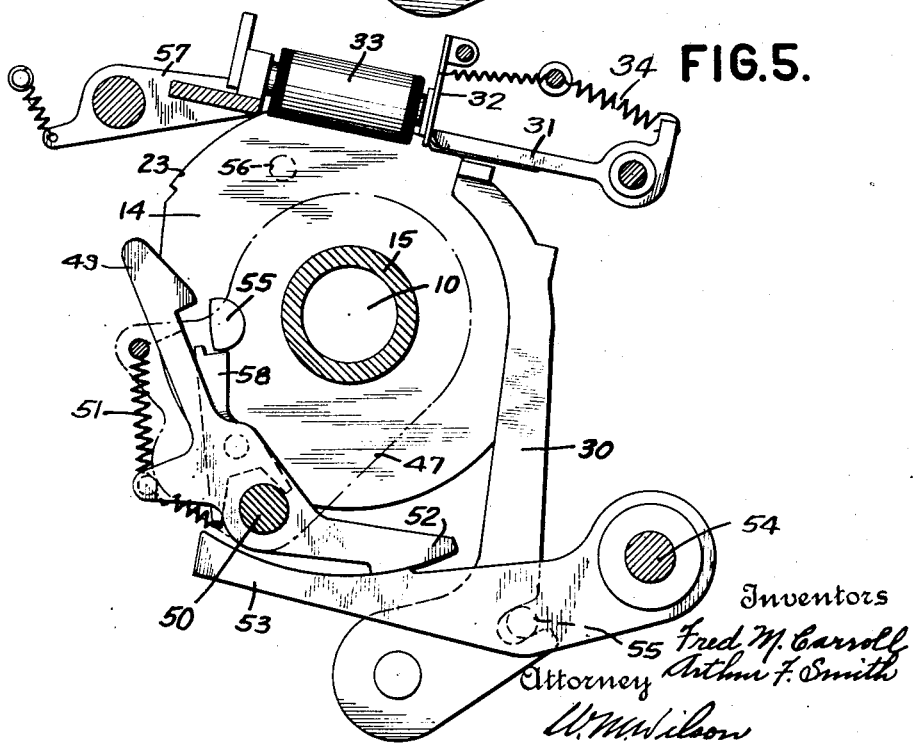
Fig. 5 is a further position view of the parts.

Figure 5 shows the relative positions of these parts after energization of magnet 33. Arm 30 which is constantly urged in a counterclockwise direction by spring 29 (Figs. 2 and 3) acting through arm 26 and sleeve 27, presses against plate 31. Plate 31 locks arm 30 in the position of Fig. 4 since armature latch 32 prevents movement of plate 31 out of the path of arm 30. Release of plate 31 by the armature permits the pressure of the upper end of arm 30 to overcome the opposing action of spring 34, resulting in the clockwise rocking of plate 31 to permit arm 30 to swing to the position of Fig. 5.

Clutching engagement between the disks 12 and 14 is effected by energization of the magnet 33 which attracts its armature 32 releasing plate 31 so that spring 29 acting through levers 26, 25 and 24 may rock the latch 19 in a counterclockwise direction to release pawl 17. The pawl then rocks clockwise under action of its spring 18 and its nose 35 is moved to the bottom of the notch 13 in moving member 12, the time of operation of the magnet being arranged to occur when the bottom of the notch is opposite nose 35. The tail piece 36 of pawl 17 will engage the beveled end of member 37 (see Fig. 7), the biasing spring of the latter yielding to permit this action. The trailing edge of notch 13 as indicated at 38 consists of a camming surface terminating at the periphery of the disk in a slightly undercut portion 39.

As the disk 14 on which the pawl 17 is pivotally mounted still tends to remain stationary, the camming surface 38 on the moving disk 12 cams the pawl counterclockwise, forcing its tail piece 36 against the upper edge of the beveled end of member 37 thereby forcing the disk 14 in a clockwise direction, that is, in the same direction as the disk 12 is moving. This is effected by the point of contact between 37 and 36 acting as a fulcrum for pawl 17, resulting in the clockwise movement of the pivot pin of the pawl 17 which is carried by disk 14 and ring 20. Owing to the configuration of surface 38 the camming action on the pawl starts the disk 14 rotating with gradually increasing speed and when the nose 35 reaches the undercut portion 39, clutching the two disks together, the two disks will be moving at substantially the same speed and the clutching operation will be effected with no shock to its associated parts.

The clutching mechanism just described is more fully shown and described in Patent No. 1,761,774 granted to F. M. Carroll, June 3, 1930, to which reference may be had for a more detailed explanation.

The shaft 11 will continue to rotate until the pawl 17 is again latched by latch 19. The latter, of course, has been moved out of the path of the extending tail piece of the pawl by the action of spring 29 and cannot reengage the pawl until the parts are restored to the position of Fig. 3. Once each revolution during rotation of disk 14 its camming portion 23 engages finger 22 and rocks the associated linkage to normal position moving arm 30 to its latching position where plate 31 will drop into engagement therewith and armature 32 will lock the plate down.

The parts are thus restored and lever 26 is latched in the position of Fig. 2 in which position the end 28 of pawl 17 will be engaged thereby later in the cycle, causing the pawl to be rocked out of engagement with disk 12. Due to the momentum of the parts, considering the machine to be operating at speed the disk 14 will be carried along in a clockwise direction and tail piece 36 will be engaged by latch 19 and movement of the disk ceases.

It is obvious that the shaft 11 could be driven for any number of complete revolutions by energizing magnet 33 at the proper time during each revolution to release the latching mechanism before unclutching of the disks has actually occurred. The cam 23 of disk 14 rocks the arm 30 into latching position and it will be latched by the armature structure if the magnet is not energized at this time. The arm 30 is rocked, however, before the end 28 of pawl 17 reaches lever 26 and if the magnet is energized either at the time when arm 30 is rocked to latching position or between the time when the arm is so rocked and the time the pawl reaches lever 26, the parts will move back to unlatching position and the clutching action of the disks will continue for another revolution. By proper energization of the magnet 33, then, the shaft 11 may be driven any desired number of complete revolutions.

When the pawl 17 is disengaged from disk 12, the disk and its associated mechanism may be traveling at considerable speed and the inertia of the mass sufficiently great to carry the disk 14 beyond its initial position. Furthermore, to stop the device with any of the usual fixed stops would incur undesirable shock and strain. To obviate this condition the mechanism about to be described is employed to exert a control over the freed mass of driven mechanism to gradually decelerate the same to zero velocity.

Figure 1:
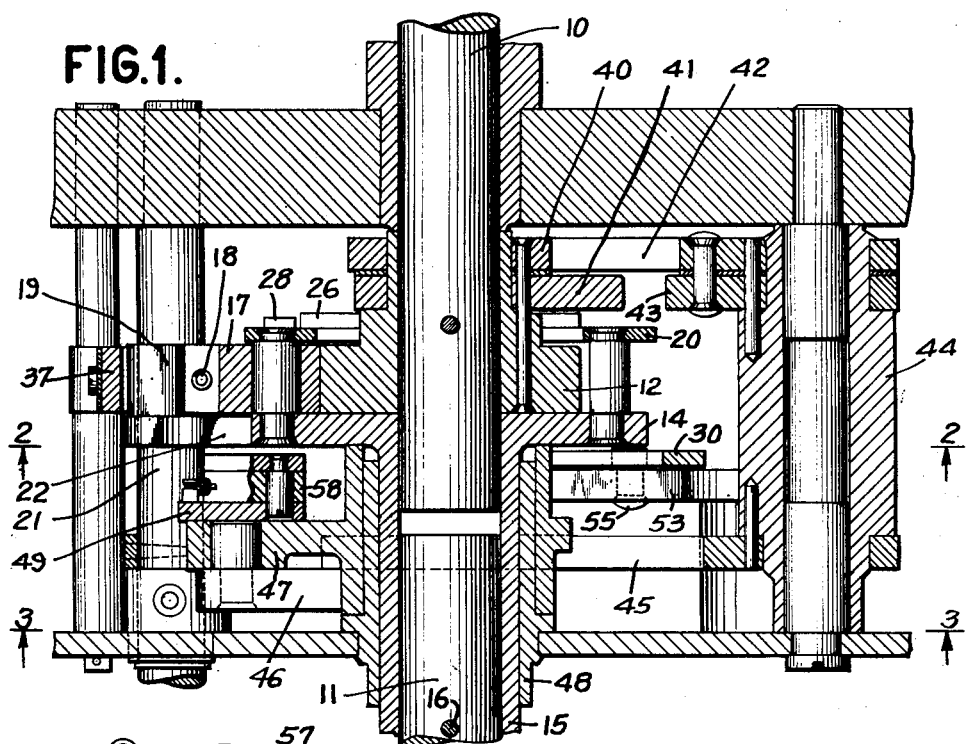
Fig. 1 is a plan section of the clutch mechanism assembled.

Secured to constantly rotating disk 12 (Figs. 1 and 2) is a pair of complementary cams 40 and 41 adapted to actuate follower arms 42 and 43 respectively (see also Fig. 6). These arms are integral with a sleeve 44 which carries at its other end an arm 45 (see Fig. 3) whose free end is link connected as at 46 to a member 47 mounted for oscillation upon a fixed bearing 48. Member 47 under control of the cams 40, 41 is adapted to oscillate between the positions of Fig. 3 and Fig. 5 carrying therewith a retarding hook 49 pivoted thereto at 50 and biased in a clockwise direction by a spring 51. The end 52 of hook 49 cooperates for the extent of its travel with an arcuate portion of an arm 53 loosely pivoted at 54 and having a pin 55 engaged in a suitable slot in arm 30.

When arm 30 is latched as in Figs. 3 and 4, arm 53 is held out of cooperation with end 52 and when the arm 30 trips to the position of Fig. 5 arm 53 rocks in a clockwise direction into engagement with end 52 rocking the same and causing hook 49 to maintain the relationship to member 47 shown in Fig. 5 throughout its movement. The hook 49 is adapted to engage a pin 55 in disk 14 and the cams 40, 41 are so generated that the hook moves downwardly from its upper position with rapid acceleration to its lower position where it dwells momentarily and then returns to the upper position with equally rapid deceleration commencing with a velocity approximating the angular speed of the pin 55 under normal running conditions of the machine.

In this manner, when the driven parts are to be stopped and the arm 30 is relatched as heretofore explained, the parts will be in the position of Fig. 4 at the time of latching. Arm 53 is out of engagement with end 52 and spring 51 has rocked hook 49 over pin 55. Pin 55 and its associated driven mechanism will subsequently be released from the driving disk 12 as explained and permitted to continue under its own momentum which if unimpeded would ordinarily carry the mechanism over and beyond initial starting position.

However, hook 49 having moved into engagement with pin 55 exerts a retarding influence which rapidly decelerates the parts and brings them to rest with a smooth motion devoid of shock. As the hook approaches its upper position it engages an eccentrically mounted pin 56 in the fixed framework of the device which moves it out of engagement with the pin, leaving the same free to perform another cycle upon further tripping of the armature 32. A spring pressed pawl 57 drops into engagement with a suitable notch in disk 14 to prevent any retrograde displacement of the parts.

If at the time arm 30 is relatched to disconnect the driving connection, the driven parts are not traveling with speed sufficient to develop the necessary momentum to restore themselves, a pawl 58 pivotally mounted on hook 49 and spring pressed against pivot 50 will drop behind pin 55 as in Fig. 4 and the positive upward movement of hook 49 will turn the parts in a clockwise direction to bring them to starting position.

In such manner, regardless of whether the momentum of the driven mechanism is great or small at the moment of disconnection from the driving member, the secondary driving mechanism just described will come into play at such time to positively return the mechanism to neutral position and in either case the approach to home position will be with decelerated motion conducive to quiet operation.

While there has been shown and described and pointed out the fundamental novel features of the invention as applied to a single modification, it will be understood that various omissions and substitutions and changes in the form and details of the device illustrated and in its operation may be made by those skilled in the art without departing from the spirit of the invention. It is the intention therefore to be limited only as indicated by the scope of the following claims:

1. A clutch mechanism comprising a primary driving element, a secondary driving element, a driven element, primary and secondary clutching mechanism for connecting said driven element to said primary and secondary driving elements respectively, and means for independently connecting said driving elements to said driven element for operation.

2. A clutch mechanism comprising a driven element and a driving element, with clutching mechanism therebetween; a second driving element and means controlled by said clutching mechanism for connecting said driven element to said second driving element for operation.

3. A clutch mechanism comprising a driven element, a driving element operating at a constant speed, a driving element operating at a varying speed, clutching mechanism for connecting said driven element to said first named driving element and means controlled by said clutching mechanism for connecting said driven element to said second named driving element.

4. In a device of the class described comprising in combination, a continuously rotatable shaft, a shaft capable of having a rotation of fixed extent from normal, and a device operated by said continuously rotatable shaft for bringing the other shaft to its normal position if rotated less than a fixed extent.

5. A clutch mechanism comprising a driving element and a driven element with clutching mechanism therebetween; means controlled by the driving element for driving the driven element at gradually increasing speed prior to a clutching operation, and means controlled by the driving element for driving the driven element at gradually decreasing speed subsequent to a declutching operation.

6. A clutch mechanism comprising a driving element and a driven element with clutching mechanism therebetween, said clutching mechanism comprising means for starting said driven member prior to a clutching operation, and said driving element comprising means controlled by said clutching mechanism for decelerating said driven member subsequent to a clutching operation.

7. A clutch mechanism comprising a driving element and a driven element with clutching mechanism therebetween, said clutching mechanism comprising means for starting said driven element and bringing its speed to substantially that of the driving element prior to a clutching operation and means operative subsequent to a declutching operation for positively bringing the driven member to rest in starting position from substantially the speed of the driving element.

8. A clutch comprising a driving element and a driven element with clutching mechanism between the two, means coacting with said clutching mechanism to hold the driven element in a predetermined position, means for releasing said clutching mechanism before the driven element reaches the predetermined position and means for positively advancing said driven element to the predetermined position.

9. A clutch comprising a driving element and a driven element with clutching mechanism between the two, means coacting with said clutching mechanism to hold the driven element in a predetermined position, means for releasing said clutching mechanism before the driven element reaches the predetermined position and means controlled by the clutching mechanism for causing the positive advance of the driven element to the predetermined position.

10. A clutch mechanism comprising a driven element and a driving element, with clutching mechanism therebetween; a second driving element and means controlled by said clutching mechanism for connecting said driven element to the second driving element upon the release of the first mentioned driving element.

11. A clutch mechanism comprising a driven element and a rotating driver with clutching mechanism therebetween, an oscillating driver and means controlled by the clutching mechanism for connecting the driven element to the oscillating driver upon the release of the driven element from the rotating driver.

12. In a device of the class described comprising in combination, a continuously rotatable driver, a driven element capable of having a rotation of fixed extent from normal, means for connecting the driven element to said driver, and means operative upon the release of said element from said driver for bringing the element to its normal position if rotated less than a fixed extent.

FRED M. CARROLL.
ARTHUR F. SMITH.